Jan. 15, 1957　　　N. LE R. BARNETT　　　2,777,383
CONDENSATION DEVICE

Filed June 5, 1953　　　　　　　　　　2 Sheets-Sheet 1

INVENTOR
NELSON LE ROY BARNETT

BY　*(signature)*
ATTORNEY

Jan. 15, 1957
N. LE R. BARNETT
2,777,383
CONDENSATION DEVICE
Filed June 5, 1953
2 Sheets-Sheet 2
*Fig. 2.*
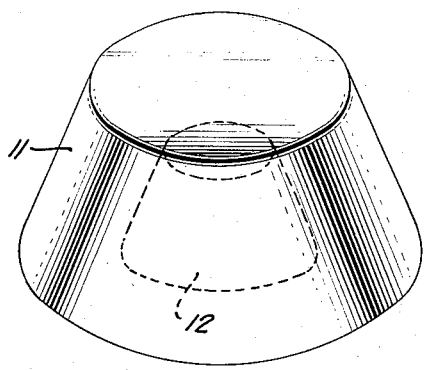
*Fig. 3.*
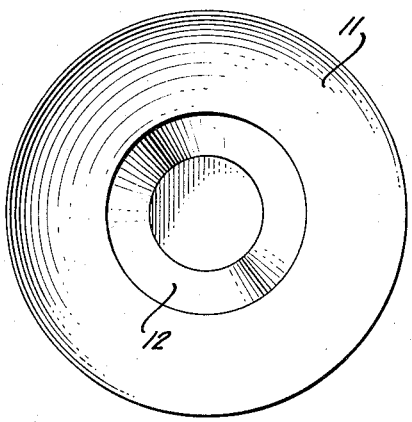
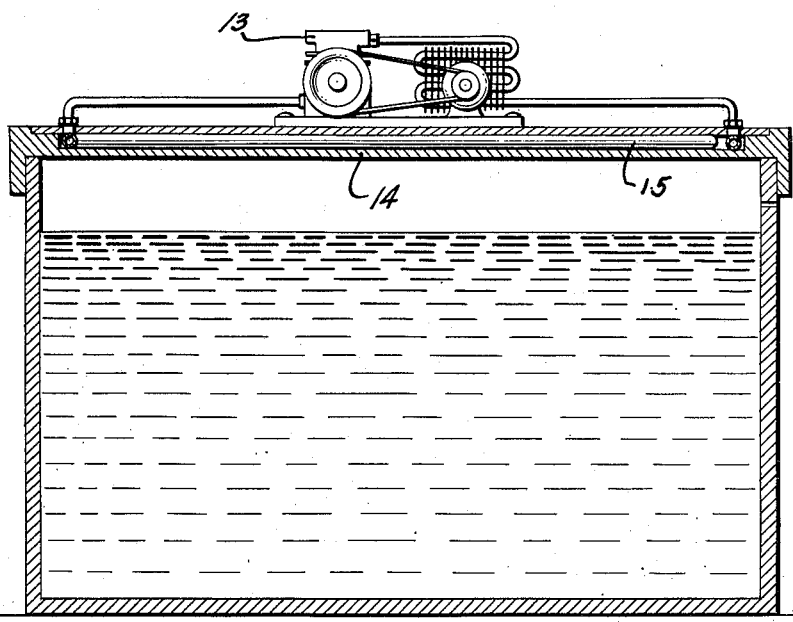
*Fig. 4.*
INVENTOR
NELSON LEROY BARNETT
BY
ATTORNEY

United States Patent Office 2,777,383
Patented Jan. 15, 1957

2,777,383

CONDENSATION DEVICE

Nelson Le Roy Barnett, Charlotte Court House, Va.

Application June 5, 1953, Serial No. 359,730

2 Claims. (Cl. 99—293)

This invention relates to a new and useful improvement in a condensation device.

It is well known in the art that when a liquid is boiled, and particularly water, steam is given off. For illustrative purposes only, take, for example, the well known coffee percolator. When the water therein is boiled it seeps through the coffee and much of the water changes to steam thereby carrying with it, from the perculator, the coffee ingredients; thereby this method of making coffee not only causes waste of water but also loss of ingredients that go to make coffee.

One of the objects of this invention is the provision of a condensation device or coolant unit adapted to cool the portion of a container that comes in contact with steam or hot vapors.

Another object of this invention is the provision of a coolant adapted to cool the top of a container exposed to steam and thereby cause its condensation.

A further object of this invention is the provision of a coolant unit adapted to engage the top of a vessel exposed to steam and thereby cause its condensation so as to convert said steam back to liquid.

Other objects and features will more fully appear from the following description and accompanying drawings, in which:

Fig. 2 is a perspective of said cooling unit;

Fig. 3 is a basal view, and

Figure 1:
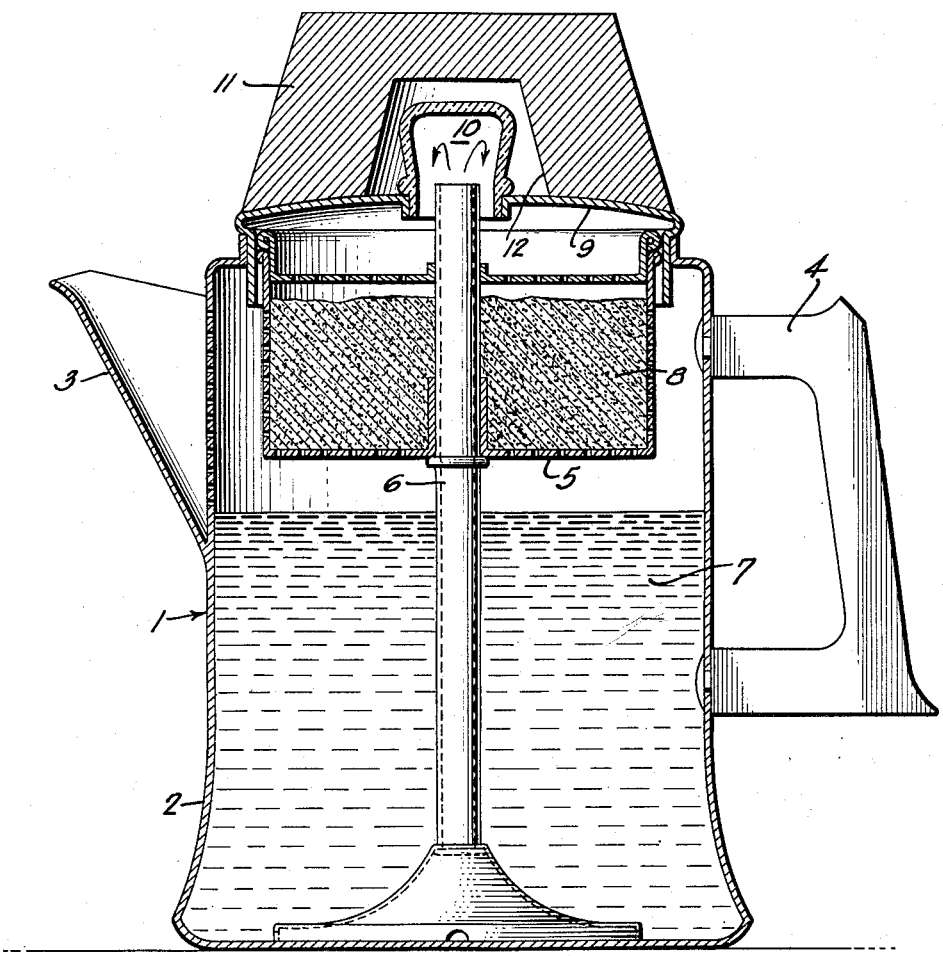
Fig. 1 is a sectional perspective of a percolator showing cooling unit thereon.

Fig. 4 a modification.

Referring more particularly to the drawings, a percolator 1 consists of a container 2 having a spout 3 and a handle 4. A perforated basket 5, for holding coffee is disposed upon a tube 6 resting on the base of container 1 and is adapted to convey water 7 through and over coffee 8 and thence to said water in said container.

A top 9 has therein a glass bulb 10, all of the foregoing being the usual construction of a percolator.

Now, as hereinbefore stated, some of the water 7, when boiling or heated, is converted into steam and contacts top 9. In order to cool said top a solid casing or cover 11 made of any suitable retentive coolant material, such, for instance, as iron, has a recess 12 disposed in its basal portion adapted to house bulb 10 and said cover is adapted, after being thoroughly cooled, for disposition on top 9. It is thought obvious that the cold cover 11 will cool or chill top 9 so that when the steam or hot vapor comes in contact with said top condensation will take place.

Referring to the modification, a refrigeration unit 13 (well known in the art) is secured to a top 14; said unit has its refrigeration coils 15 disposed in said top so as to cool it and cause condensation as hereinbefore explained.

This type of cooling unit is adapted for use in large vessels and vats.

Applicant within the scope of this invention and the range of equivalents expressly states that the coolant may consist of cool air or water running through suitable tubes or structure.

It is therefore thought obvious that applicant by the provision of such invention not only conserves the liquid which is now generally lost from containers, but also a condensed mixed liquid retains its ingredients and aroma, for example coffee, that might otherwise pass off with the steam.

Having described this invention, what is claimed is:

1. In a percolator having a coffee basket therein, the combination with a percolator having a top and a bulb in said top projecting upwardly therefrom, consisting of a solid metallic casing having a recess in its basal portion registering with and substantially housing said bulb, said casing being substantially taller than said bulb, said basal portion being complemental to and in physical contact with the greater area portion of said top, whereby heat may be conducted away from said top into said casing and thereby cause condensation of vapor and steam within said top.

2. In a device of the character described in combination with a percolator having a top and a bulb mounted in removable fashion in said top and projecting upwardly therefrom, consisting of a solid metallic heat absorbing casing; a recess in the basal portion of said casing adapted to register with and house said bulb; said basal portion of said casing adapted to rest flush upon the greater area portion of said top and receive heat from the latter so as to effect condensation of vapor and steam within said top.

References Cited in the file of this patent

UNITED STATES PATENTS

| | | |
|---|---|---|
| 50,412 | Zopff | Oct. 10, 1865 |
| 370,827 | Stringer | Oct. 4, 1887 |
| 371,228 | Tailor | Oct. 11, 1887 |
| 544,963 | Cummings | Aug. 20, 1895 |
| 662,541 | Miskolczy | Nov. 27, 1900 |
| 1,225,812 | Hester | May 15, 1917 |
| 1,306,688 | Downham | June 17, 1919 |
| 1,370,863 | Wagner | Mar. 8, 1921 |
| 1,486,943 | Bates | Mar. 18, 1924 |
| 1,554,612 | Wilson et al. | Sept. 22, 1925 |
| 2,278,192 | Cantacuzene | Mar. 31, 1942 |
| 2,548,325 | Smith | Apr. 10, 1951 |
| 2,622,591 | Bramberry | Dec. 23, 1952 |